US011243701B2

(12) United States Patent
Wu et al.

(10) Patent No.: US 11,243,701 B2
(45) Date of Patent: Feb. 8, 2022

(54) DATA WRITE METHOD AND SOLID-STATE DRIVE ARRAY

(71) Applicant: HUAWEI TECHNOLOGIES CO., LTD., Shenzhen (CN)

(72) Inventors: Dengben Wu, Hangzhou (CN); Xiaoxin Xu, Hangzhou (CN); Junjie Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/914,375

(22) Filed: Jun. 28, 2020

(65) Prior Publication Data

US 2020/0326855 A1 Oct. 15, 2020

Related U.S. Application Data

(63) Continuation of application No. PCT/CN2017/119390, filed on Dec. 28, 2017.

(51) Int. Cl.
*G06F 3/06* (2006.01)

(52) U.S. Cl.
CPC ............ *G06F 3/064* (2013.01); *G06F 3/0619* (2013.01); *G06F 3/0629* (2013.01); *G06F 3/0659* (2013.01); *G06F 3/0688* (2013.01)

(58) Field of Classification Search
CPC ...... G06F 3/064; G06F 3/0619; G06F 3/0629; G06F 3/0659; G06F 3/0688
See application file for complete search history.

(56) References Cited

U.S. PATENT DOCUMENTS

| | | | | |
|---|---|---|---|---|
| 6,895,490 | B1 | 5/2005 | Moore et al. | |
| 10,956,346 | B1 * | 3/2021 | Ben-Yehuda | G06F 12/10 |
| 2015/0160999 | A1 | 6/2015 | Seo et al. | |
| 2016/0170850 | A1 * | 6/2016 | Williams | G06F 3/064 714/6.23 |
| 2016/0335006 | A1 * | 11/2016 | Rose | G06F 3/0688 |
| 2017/0329522 | A1 | 11/2017 | Yang | |
| 2020/0117368 | A1 | 4/2020 | Song et al. | |

FOREIGN PATENT DOCUMENTS

| | | | |
|---|---|---|---|
| CN | 102073595 | A | 5/2011 |
| CN | 103514095 | A | 1/2014 |
| CN | 104794070 | A | 7/2015 |
| CN | 105528180 | A | 4/2016 |

(Continued)

*Primary Examiner* — Eric Cardwell
(74) *Attorney, Agent, or Firm* — Maier & Maier, PLLC

(57) ABSTRACT

The present invention provides a data write method and a solid-state drive array. The solid-state drive array is based on a RAID system and includes n solid-state drives. Before to-be-written data is written into the solid-state drive array, the to-be-written data is divided into n data blocks that are in a one-to-one correspondence with the n solid-state drives. After the n data blocks are all stored into the corresponding solid-state drives, FTL update of the n data blocks is performed, to complete write of the to-be-written data. If the solid-state drive array is powered off during storage of the n data blocks, because FTL update of the data blocks is not performed, all the n data blocks fail to be written into the solid-state drive array, thereby ensuring atomicity of write operations of the n data blocks.

10 Claims, 5 Drawing Sheets

An array controller 100 generates, for each of n data blocks, a data write command that includes a physical address — 301

The array controller 100 sends the generated n data write commands to n corresponding solid-state drives, respectively — 302

The array controller 100 receives a write success message returned by each solid-state drive — 303

The array controller 100 stores n write logs after determining that n write success messages are received — 304

The array controller 100 performs FTL update of the data blocks for a first time after determining that the n write logs are stored — 305

The array controller 100 stores the n write logs after determining that the n write success messages are received — 306

(56) References Cited

FOREIGN PATENT DOCUMENTS

| | | | |
|---|---|---|---|
| CN | 106155915 | A | 11/2016 |
| CN | 106354615 | A | 1/2017 |
| CN | 106681848 | A | 5/2017 |
| CN | 107111453 | A | 8/2017 |
| CN | 107391391 | A | 11/2017 |

* cited by examiner

DATA WRITE METHOD AND SOLID-STATE DRIVE ARRAY

CROSS-REFERENCE TO RELATED APPLICATIONS

This application is a continuation of International Application No. PCT/CN2017/119390, filed on Dec. 28, 2017, the disclosure of which is hereby incorporated by reference in its entirety.

TECHNICAL FIELD

This application relates to the field of information technologies, and in particular, to a data write method and a solid-state drive array.

BACKGROUND

In a disk array technology (Redundant Array Of Independent Disks, RAID), namely, in a redundant array of independent disks, a plurality of independent disks are combined in different manners to form a disk array, to improve efficiency of the entire disk array by using an addition effect generated by data provided on the individual disks. In the RAID technology, data is divided into several segments, and each segment is a strip and is stored in each disk in the disk array, to provide data redundancy. When a segment of data in any disk in the disk array is lost due to a fault, a system can still read complete data through parity check, and during data reconstruction, the system can re-store the lost segment of data into the disk after calculation.

In a disk array using the RAID technology, when to-be-written data that is divided into strips is written into each disk, atomicity of data write operations needs to be ensured. To be specific, after one write operation of writing the to-be-written data into the disk array is performed, write operations on all the disks in the disk array need to either all succeed or all fail. If data is successfully written into some disks and data fails to be written into the remaining disks, data in strips in the disk array is inconsistent, and consequently data redundancy provided by the RAID is invalid.

However, if the system is powered off when write operations are performed on the disks in the disk array concurrently, write operations on some disks succeed, and write operations on some disks fail. This cannot ensure atomicity of data write operations. Consequently, data in strips in the disk array is inconsistent, and data redundancy provided by the RAID technology is invalid.

SUMMARY

Embodiments of the present invention provide a data write method and a solid-state drive array, so that when n data blocks are written into n solid-state drives, atomicity of write operations of the data blocks can be implemented.

According to a first aspect, the present invention provides a data write method, where the method is applied to a solid-state drive array, and the method includes: obtaining, by a controller of the solid-state drive array, to-be-written data, where the to-be-written data includes n data blocks; generating, by the controller, n write commands, where the n write commands are in a one-to-one correspondence with the n data blocks; sending, by the controller, the n write commands to n solid-state drives in the solid-state drive array, respectively, where the n write commands are in a one-to-one correspondence with the n solid-state drives, and each write command is used to request a corresponding solid-state drive to store a data block corresponding to the write command; determining, by the controller, whether n write success responses corresponding to the n write commands are received; and if the controller determines that the n write success responses corresponding to the n write commands are received, triggering, by the controller, flash translation layer (FTL) update of the n data blocks, where FTL update of each data block includes: establishing, in an FTL list, a mapping relationship between a logical address of each data block and a current physical address of the data block.

Data storage and FTL list update are separated. This ensures atomicity of write operations after the array controller or each solid-state drive is powered off in a process of storing data into an idle physical storage space. In addition, in the method, extra I/O overheads brought by the write success responses are relatively small, and this does not greatly affect a data write speed.

With reference to the first aspect, in a first implementation of the first aspect, if the controller determines that the n write success responses corresponding to the n write commands are received, before the triggering, by the controller, FTL update of the n data blocks, the method further includes: generating, by the controller, n write logs, and storing the n write logs into a non-volatile memory, where the n write logs are in a one-to-one correspondence with the n data blocks, and each write log records index information of a corresponding data block.

When the array controller or each solid-state drive is powered off during FTL update, FTL update on some solid-state drives is completed, and FTL update on the remaining solid-state drives is not completed. Consequently, corresponding data blocks are successfully written into some solid-state drives, and corresponding data blocks fail to be written into some solid-state drives, resulting in inconsistency between write operations. The write log avoids the inconsistency.

With reference to the first implementation of the first aspect, in a second implementation of the first aspect, each solid-state drive in the solid-state drive array maintains an FTL list of a current node, and the FTL list of the current node of each solid-state drive is used to record a mapping relationship between a logical address and a physical address of a data block stored in the solid-state drive; and the triggering, by the controller, FTL update of the n data blocks specifically includes: generating, by the controller, n update commands, where the n update commands are in a one-to-one correspondence with the n data blocks; and sending, by the controller, the n update commands to the n solid-state drives, respectively, where each update command is used to request a corresponding solid-state drive to perform FTL update of a corresponding data block.

This implementation provides a method used by the controller to trigger FTL update of the data blocks when FTL management is implemented on each solid-state drive, thereby improving integrity of the solution.

With reference to the second implementation of the first aspect, in a third implementation of the first aspect, the method further includes: receiving, by the controller, an update success message sent by any one of the n solid-state drives, and deleting, by the controller, a write log of a data block corresponding to the solid-state drive that sends the update success message.

This implementation provides a write log processing method, to avoid a case in which all the data blocks need to be updated when FTL update is re-triggered, and improve efficiency of writing the to-be-written data.

With reference to the first implementation of the first aspect, in a fourth implementation of the first aspect, the controller maintains a global FTL list, and the global FTL list is used to record a mapping relationship between a logical address and a physical address of a data block stored in the solid-state drive array; and the triggering, by the controller, FTL update of the n data blocks includes: establishing, by the controller in the global FTL list based on a cached mapping relationship between a logical address and a current physical address to which each of the n data blocks is stored, the mapping relationship between the logical address of each of the n data blocks and the current physical address of each of the n data blocks.

This implementation provides a method used by the controller to trigger FTL update of the data blocks when FTL management is implemented on the controller, thereby supplementing integrity of the solution.

With reference to the fourth implementation of the first aspect, in a fifth implementation of the first aspect, after completing FTL update of a data block, the controller deletes a write log corresponding to the data block on which FTL update is completed.

This implementation provides a write log processing method, to avoid a case in which all the data blocks need to be updated when FTL update is re-triggered, and improve efficiency of writing the to-be-written data.

With reference to any one of the first to fifth implementations of the first aspect, in a sixth implementation of the first aspect, the method further includes: after the solid-state drive array and/or the controller are/is powered on again, determining, by the controller, a status of a write log stored in the non-volatile memory; and if the write log stored in the non-volatile memory of the controller is in a first state, re-initiating, by the controller, a write operation of writing the to-be-written data.

With reference to any one of the first to sixth implementations of the first aspect, in a seventh implementation of the first aspect, the method further includes: after the solid-state drive array and/or the controller are/is powered on again, determining, by the controller, a status of a write log stored in the non-volatile memory; and if the write log stored in the non-volatile memory of the controller is in a second state, re-triggering FTL update based on the write log stored in the non-volatile memory of the controller.

With reference to the seventh implementation of the first aspect, in an eighth implementation of the first aspect, the re-triggering, by the controller, FTL update based on the write log in the non-volatile memory of the controller includes: obtaining, by the controller, index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining, by the controller, index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

With reference to the eighth implementation of the first aspect, in a ninth implementation of the first aspect, the method further includes: determining, by the controller, whether FTL update of a data block is completed, and deleting a write log corresponding to a data block on which FTL update is completed.

According to a second aspect, the present invention provides a solid-state drive array controller, where the controller includes a data obtaining unit, a write command generation unit, a write command sending unit, a determining unit, and an update unit; the data obtaining unit is configured to obtain to-be-written data, where the to-be-written data includes n data blocks; the write command generation unit is configured to generate n write commands, where the n write commands are in a one-to-one correspondence with the n data blocks; the write command sending unit is configured to send the n write commands to n solid-state drives in the solid-state drive array, respectively, where the n write commands are in a one-to-one correspondence with the n solid-state drives, and each write command is used to request a corresponding solid-state drive to store a data block corresponding to the write command; the determining unit is configured to determine whether n write success responses corresponding to the n solid-state drives are received; and if it is determined that the n write success responses corresponding to the n write commands are received, the update unit is configured to perform FTL update of the n data blocks, where FTL update of each data block includes: establishing, in an FTL list, a mapping relationship between a logical address of each data block and a current physical address of the data block.

Data storage and FTL list update are separated. This ensures atomicity of write operations after the array controller or each solid-state drive is powered off in a process of storing data into an idle physical storage space. In addition, in the method, extra I/O overheads brought by the write success responses are relatively small, and this does not greatly affect a data write speed.

With reference to the second aspect, in a first implementation of the second aspect, the controller further includes a log storage unit; and if the determining unit determines that the n write success responses corresponding to the n write commands are received, before the update unit performs FTL update of the n data blocks, the log storage unit is configured to: generate n write logs, and store the n write logs, where the n write logs are in a one-to-one correspondence with the n data blocks, and each write log records index information of a corresponding data block.

When an array controller 100 or each solid-state drive is powered off during FTL update, FTL update on some solid-state drives is completed, and FTL update on the remaining solid-state drives is not completed. Consequently, corresponding data blocks are successfully written into some solid-state drives, and corresponding data blocks fail to be written into some solid-state drives, resulting in inconsistency between write operations. The write log avoids the inconsistency.

With reference to the first implementation of the second aspect, in a second implementation of the second aspect, each solid-state drive in the solid-state drive array maintains an FTL list of a current node, and the FTL list of the current node of each solid-state drive is used to record a mapping relationship between a logical address and a physical address of a data block stored in the solid-state drive; and that the update unit is configured to trigger FTL update of the n data blocks specifically includes: generating n update commands, where the n update commands are in a one-to-one correspondence with the n data blocks; and sending the n update commands to the n solid-state drives, respectively, where each update command is used to request a corresponding solid-state drive to perform FTL update of a corresponding data block.

With reference to the second implementation of the second aspect, in a third implementation of the second aspect, the controller further includes a deletion unit, and the deletion unit is configured to: receive an update success message sent by any one of the n solid-state drives, and delete a write log of a data block corresponding to the solid-state drive that sends the update success message.

With reference to the first implementation of the second aspect, in a fourth implementation of the second aspect, the controller further includes a maintaining unit, the maintaining unit is configured to maintain a global FTL list, and the global FTL list is used to record a mapping relationship between a logical address and a physical address of a data block stored in the solid-state drive array; and that the update unit is configured to trigger FTL update of the n data blocks specifically includes: the update unit is configured to instruct, based on a logical address of each of the n data blocks, the maintaining unit to establish, in the global FTL list, a mapping relationship between the logical address of each of the n data blocks and a physical address of each of the n data blocks.

With reference to the fourth implementation of the second aspect, in a fifth implementation of the second aspect, the controller further includes a deletion unit, and the deletion unit is configured to: after FTL update of a data block is completed, delete a write log corresponding to the data block on which FTL update is completed.

With reference to any one of the first to fifth implementations of the second aspect, in a sixth implementation of the second aspect, after the solid-state drive array and/or the controller are/is powered on again, the determining unit is further configured to determine a status of a write log stored in a non-volatile memory of the controller; and if the write log stored in the non-volatile memory of the controller is in a first state, the write command sending unit is further configured to re-initiate a write operation of the to-be-written data.

With reference to any one of the first to sixth implementations of the second aspect, in a seventh implementation of the second aspect, after the solid-state drive array and/or the controller are/is powered on again, the determining unit is further configured to determine a status of a write log stored in a non-volatile memory of the controller; and if the write log stored in the non-volatile memory of the controller is in a second state, the update unit is further configured to re-trigger FTL update based on the write log stored in the non-volatile memory of the controller.

With reference to the seventh implementation of the second aspect, in an eighth implementation of the second aspect, that the update unit is configured to re-trigger FTL update based on the write log in the non-volatile memory specifically includes: obtaining index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

With reference to the eighth implementation of the second aspect, in a ninth implementation of the second aspect, the determining unit is further configured to determine whether FTL update of a data block is completed, and the deletion unit is further configured to: after the determining unit determines that FTL update of a data block is completed, delete a write log corresponding to the data block on which FTL update is completed.

According to a third aspect, the present invention provides a solid-state drive array controller, where the controller includes a processor and a memory, and the processor is configured to execute a computer instruction stored in the memory to implement any implementation of the first aspect.

According to a fourth aspect, the present invention further provides a computer program product and a non-volatile computer readable storage medium, where the computer program product and the non-volatile computer readable storage medium include a computer instruction, and the processor executes the computer instruction to implement various methods in the first aspect of the present invention.

According to a fifth aspect, the present invention provides a solid-state drive array, where the solid-state drive array includes a controller and n solid-state drives; the controller is configured to: obtain to-be-written data, where the to-be-written data includes n data blocks; generate n write commands, where the n write commands are in a one-to-one correspondence with the n data blocks; and send the n write commands to the n solid-state drives, respectively, where the n write commands are in a one-to-one correspondence with the n solid-state drives; each of the n solid-state drives is configured to: store, based on a corresponding write command, a data block corresponding to the write command; and after storing the data block corresponding to the write command, send a write success response to the controller; and the controller is further configured to: determine whether n write success responses corresponding to the n write commands are received; and if determining that the n write success responses corresponding to the n write commands are received, trigger FTL update of the n data blocks, where FTL update of each data block includes: establishing, in an FTL list, a mapping relationship between a logical address of each data block and a current physical address of the data block.

With reference to the fifth aspect, in a first implementation of the fifth aspect, the controller is further configured to: if determining that the n write success responses corresponding to the n write commands are received, before triggering FTL update of the n data blocks, generate n write logs, and store the n write logs into a non-volatile memory of the controller, where the n write logs are in a one-to-one correspondence with the n data blocks, and each write log records index information of a corresponding data block.

With reference to the first implementation of the fifth aspect, in a second implementation of the fifth aspect, each solid-state drive in the solid-state drive array is further configured to maintain an FTL list of a current node, where the FTL list of the current node of each solid-state drive is used to record a mapping relationship between a logical address and a physical address of a data block stored in the solid-state drive; that the controller is configured to trigger FTL update of the n data blocks specifically includes: generating n update commands, where the n update commands are in a one-to-one correspondence with the n data blocks; and sending the n update commands to the n solid-state drives, respectively; and each solid-state drive in the solid-state drive array is further configured to: receive the update command sent by the controller, and establish, in the FTL list of the current node, a mapping relationship between a logical address of each data block and a current physical address of the data block.

With reference to the second implementation of the fifth aspect, in a third implementation of the fifth aspect, each solid-state drive is further configured to: after completing FTL update of a stored data block, send an update success message to the controller; and the controller is further configured to: receive an update success message sent by any one of the n solid-state drives, and delete a write log of a data block corresponding to the solid-state drive that sends the update success message.

With reference to the first implementation of the fifth aspect, in a fourth implementation of the fifth aspect, the controller is further configured to maintain a global FTL list, where the global FTL list is used to record a mapping relationship between a logical address and a physical address of a data block stored in the solid-state drive array; and that the controller is configured to trigger FTL update of the n data blocks specifically includes: establishing, in the global FTL list based on a cached mapping relationship between a logical address and a current physical address to which each of the n data blocks is stored, the mapping relationship between the logical address of each of then data blocks and the current physical address of each of the n data blocks.

With reference to the fourth implementation of the fifth aspect, in a fifth implementation of the fifth aspect, the controller is further configured to: after completing FTL update of a data block, delete a write log corresponding to the data block on which FTL update is completed.

With reference to any one of the first to fifth implementations of the fifth aspect, in a sixth implementation of the fifth aspect, the controller is further configured to: after the solid-state drive array and/or the controller are/is powered on again, determine a status of a write log stored in the non-volatile memory of the controller; and if the write log stored in the non-volatile memory of the controller is in a first state, re-initiate a write operation of the to-be-written data.

With reference to any one of the first to sixth implementations of the fifth aspect, in a seventh implementation of the fifth aspect, the controller is configured to: after the solid-state drive array and/or the controller are/is powered on again, determine a status of a write log stored in the non-volatile memory of the controller; and if the write log stored in the non-volatile memory of the controller is in a second state, re-trigger FTL update based on the write log stored in the non-volatile memory of the controller.

With reference to the seventh implementation of the fifth aspect, in an eighth implementation of the fifth aspect, that the controller is configured to re-trigger FTL update based on the write log in the non-volatile memory of the controller specifically includes: obtaining index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

With reference to the eighth implementation of the fifth aspect, in a ninth implementation of the fifth aspect, the controller is further configured to: after determining that FTL update of a data block is completed again, delete a write log corresponding to the data block on which FTL update is completed again.

DESCRIPTION OF EMBODIMENTS

Disks that constitute a disk array may be flash-memory-based solid-state drives. The embodiments provide a solid-state-drive-array-based data write method and an apparatus.

Disks that constitute a disk array may be flash-memory-based solid-state drives. A storage bit of a flash memory can be written only from 0 to 1. When the storage bit needs to be written from 1 to 0, the data bit first needs to be erased. Therefore, when a data write operation needs to be performed for a second time in a storage space in which data is stored in the flash memory, the storage space first needs to be erased. In addition, a write operation on the flash memory is performed by page, but an erasure operation is performed by block; in this case, a write operation is performed on a page in the flash memory for a second time, a block in which the page is located needs to be erased. Consequently, overall I/O operation efficiency is reduced, and many storage space management problems are also caused. Therefore, a software layer, namely, a FTL is added into a flash-memory-based solid-state drive. To implement in-place update when data is written into the solid-state drive, that is, to ensure that a storage space into which a data write operation is performed for a second time in the solid-state drive is still an original address space from a perspective of an upper layer, the FTL simulates the flash memory as a virtual storage device that has a logical address. Virtual storage space of the virtual storage device is mapped into a physical storage space of the flash memory, and the logical address is mapped into a physical address, so that all data input/output (I/O) operations are performed by using the logical address. The FTL manages an address of the solid-state drive, maintains, by using an FTL list, a mapping relationship between a logical address and a physical address of data stored in the solid-state drive, and also manages an idle address space of the solid-state drive.

A method for writing data into a solid-state drive into which an FTL is introduced is as follows: When data needs to be written to a logical address of a solid-state drive, the FTL allocates, to the data, an idle physical storage space into which no data is written. After the data is stored in the idle physical storage space, an FTL update operation is performed. FTL update is to establish, in an FTL list, a mapping relationship between a physical address of the idle physical storage space and a logical address, and change a physical address into which the logical address is mapped to the current physical address of the idle physical storage space, to write data, so that the current physical address can be addressed in a subsequent I/O operation based on the logical address to which the data is written.

Figure 1:
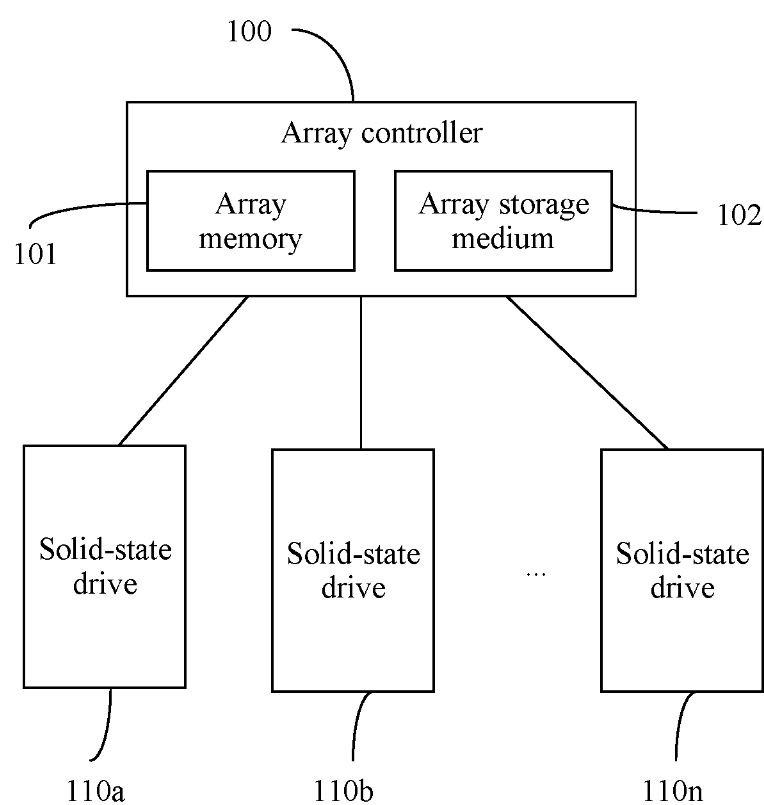
FIG. 1 is an architectural diagram of a solid-state drive array that uses a RAID technology.

An array controller is needed to implement a solid-state drive array that uses a RAID technology. As shown in FIG. 1, an array controller 100 includes an array memory 101 and an array storage medium 102. The array controller 200 is separately connected to a solid-state drive 110*a*, a solid-state drive 110*b*, . . . , and a solid-state drive 110*n* in a solid-state drive array. Before data is written into the solid-state drive array, the array controller 200 obtains to-be-written data, and the array memory 101 divides the to-be-written data into n data blocks, and stores the data blocks into the solid-state drive 110*a*, the solid-state drive 110*b*, . . . , and the solid-state drive 110*n*, respectively. If the array memory 101 is a volatile memory, data stored in the array memory 101 is lost after the array controller 200 is powered off. The array storage medium 102 is a non-volatile memory, and is configured to store data that still needs to be retained after the array controller 200 is powered off. The array controller 200 may be a RAID card independent of the solid-state drive array, or may be an array manager of the solid-state drive array. No limitation is imposed thereon in this embodiment. When the array controller 100 is an array manager of the solid-state drive array, a controller, a memory, and a storage medium of the array manager are configured to implement a function implemented by an array manager in the prior art, and are further configured to implement functions implemented by the array memory 101 and the array storage medium 102 in this embodiment.

When the to-be-written data is written into the solid-state drive array, if the array controller and/or each solid-state drive are/is powered off when each solid-state drive stores a corresponding data block, write operations are successfully performed on some solid-state drives, but write operations fail to be performed on some solid-state drives. This cannot ensure atomicity of data write operations. Consequently, data in strips in the solid-state drive array is inconsistent, and data redundancy provided by the RAID technology is invalid.

To solve this problem and ensure the atomicity of the write operations on the solid-state drives in the solid-state drive array, based on a feature that when data is written into a solid-state drive, the data is first written and then an FTL list is updated, in a method provided in this embodiment, a data write operation and an FTL list update operation are separated when data is written into a solid-state drive.

Details are as follows:

The array controller 100 performs data segmentation on the to-be-written data to divide the to-be-written data into n data blocks. A quantity of segments into which the to-be-written data is divided is the same as a quantity of solid-state drives in the solid-state drive array, and each data block is written into one solid-state drive. In this embodiment, an algorithm for dividing the to-be-written data into data blocks is not limited. The n data blocks are obtained by a RAID controller by directly dividing the to-be-written data into n blocks according to a specific algorithm. Each block may be 1/n of the to-be-written data, and may also include a verification block that includes verification code. The array controller 100 generates a write command for each data block, and sends the write commands to the solid-state drive 110*a*, the solid-state drive 110*b*, . . . , and the solid-state drive 110*n*, respectively. The data blocks are in a one-to-one correspondence with the solid-state drives. The solid-state drive 110*a*, the solid-state drive 110*b*, . . . , and the solid-state drive 110*n* receive the write commands, and store the data blocks into idle physical storage spaces of the solid-state drives, respectively. After storing the data blocks into the idle physical storage spaces, the solid-state drives return write success responses to the array controller 100 separately, instead of performing FTL update first. After receiving the n write success responses returned by the solid-state drive 110*a*, the solid-state drive 110*b*, . . . , and the solid-state drive 110*n*, the array controller triggers an FTL update action to complete write of the to-be-written data. FTL update is to establish, in an FTL list, a mapping relationship between a logical address and a current physical address of each data block based on a cached current physical address of a data block. The current physical address is a physical address of an idle physical storage space in which each data block is stored after the n data blocks are stored in the n solid-state drives, respectively.

Data storage and FTL list update are separated. This ensures atomicity of write operations after the array controller or each solid-state drive is powered off in a process of storing data into an idle physical storage space. If the array controller 100 is powered off when sending the write command to each solid-state drive, or one or several of the n solid-state drives are powered off when writing data blocks into idle physical storage spaces, apparently, the array controller 100 does not receive n write success messages, and no FTL list update operation is performed. In this case, all the data blocks fail to be written into the n solid-state drives, thereby ensuring atomicity of write operations. In addition, in the method, extra I/O overheads brought by the write success responses are relatively small, and this does not greatly affect a data write speed.

Further, when the array controller 100 or each solid-state drive is powered off during FTL update, FTL update on some solid-state drives is completed, and FTL update on the remaining solid-state drives is not completed. Consequently, corresponding data blocks are successfully written into some solid-state drives, and corresponding data blocks fail to be written into some solid-state drives, resulting in inconsistency between write operations. In this case, atomicity of write operations may be implemented by using a write log. After determining that the n write success responses are received and before performing FTL update, the array controller 100 generates a write log for each data block, and stores the write log into the array storage medium 102. To be specific, the array controller 100 stores n write logs into the array storage medium 102. The n write logs are in a one-to-one correspondence with the n data blocks, and each write log records index information of a corresponding data block. The index information is used to identify the data block. If the array controller 100 or each solid-state drive is powered off during FTL update, the array controller 100 may obtain index information in a stored write log from the array storage medium 102 after being powered on again, and find, based on the index information, a logical address into which a data block corresponding to the write log stored in the array storage medium 102 is stored. In this embodiment of the present invention, the index information may also be referred to as address information or the like. No limitation is imposed thereon in this embodiment of the present invention.

If the array controller 100 or each solid-state drive is powered off during FTL update, a method for ensuring atomicity of write operations based on a write log is specifically as follows:

The array storage medium 102 is a non-volatile memory, and the n write logs stored in the array storage medium 102 are not lost after power-off. Therefore, a data block on which FTL update needs to be performed again can be obtained based on the index information in the n write logs. After being powered on again, the array controller 100 re-triggers FTL update of the data block on which FTL update needs to be performed. Specifically, the array controller 100 obtains, based on index information in a log, a cached mapping relationship between a logical address and a current physical address of a data block; and establishes, in the FTL list, a mapping relationship between a logical address and a current physical address of a data block corresponding to each write log. The mapping relationship between the logical address and the current physical address of the data block is cached in the non-volatile memory before power-off. In conclusion, if the array controller 100 and/or the solid-state drive array are/is powered off in a process of writing the to-be-written data, after being powered on again, the array controller 100 determines a status of a write log stored in the array storage medium 102, and performs a corresponding operation based on the status of the write log, to ensure atomicity of write operations. It can be learned from the foregoing descriptions that, if the array controller 100 and/or the solid-state drive array are/is powered off before FTL update starts, the array controller 100 does not start FTL update and write log storage. In this case, no write logs exist in the array storage medium 102 or a write log stored in the array storage medium 102 includes an incomplete write log, and write operations of the data blocks all fail. Therefore, the array controller 100 re-initiates a write operation of the to-be-written data. If the array controller 100 and/or the solid-state drive array are/is powered off during FTL update of the data blocks, a write log is stored in the array storage medium 102, and FTL update of some data blocks may be completed. Therefore, the array controller 100 re-triggers FTL update based on the write log.

To be specific, in a first state, no write logs exist in the array storage medium 102 or a write log stored in the storage medium 102 includes an incomplete write log. In a second state, a write log is stored in the array storage medium 102 and each stored write log is complete. If the array controller 100 determines, after being powered on again, that the write log stored in the array storage medium 102 is in the first state, the array controller 100 re-initiates a write operation of the to-be-written data; or if the write log is in the second state, the array controller 100 re-triggers FTL update based on the write log. Further, after triggering FTL update of a data block, the array controller 100 deletes a write log corresponding to the data block. To be specific, if the array controller 100 and/or each solid-state drive are/is powered off during FTL update of the data blocks, a write log corresponding to a data block on which FTL update is completed has been deleted, and a write log stored in the array storage medium 102 is corresponding to a data block on which FTL update is not performed. After being powered on again, the array controller 100 only needs to trigger FTL update of the data block on which FTL update is not performed.

In some cases, after FTL update is re-triggered, the array controller 100 and/or the solid-state drive array are/is powered off again in a process of performing FTL update on some data blocks. After being powered on again, the array controller 100 can still re-trigger, based on a write log stored in the array storage medium 102, FTL update of a data block on which FTL update is not completed. Similarly, when FTL update is performed on the data block again after power-off, each time when FTL update of a data block is completed again, the array controller 100 deletes a write log corresponding to the data block. In this case, after power-on following power-off that occurs again, FTL update of only a data block on which FTL update is not performed needs to be triggered.

The FTL is implemented in two manners in the solid-state drive array that uses the RAID technology.

A first manner is shown in FIG. 1. FTL management is implemented on the array controller 100. In this case, a solid-state FTL function module in the array controller 100 manages logical addresses and physical addresses of all the solid-state drives in the solid-state drive array, including a mapping relationship between a physical address and a logical address into which a data block is stored in each solid-state drive, a physical address of an idle physical storage space of each solid-state drive, and the like. Specifically, the array controller 100 maintains a global FTL list. The global FTL list records a mapping relationship between a logical address and a physical address of a data block stored in the solid-state drive array. When the FTL is implemented on the array controller 100, a process in which the array controller 100 writes to-be-written data into the solid-state drive array is as follows: First, the array controller 100 divides the to-be-written data into n data blocks, and allocates, to each data block, a solid-state drive and a logical address in the corresponding solid-state drive. After the FTL function module in the array controller 100 allocates, to each logical address, a physical address of an idle physical storage space of a corresponding solid-state drive, the array controller 100 generates n data write commands that include n physical addresses, and delivers the n data write commands to the solid-state drive 110*a*, the solid-state drive 110*b*, . . . , and the solid-state drive 110*n*, respectively. Finally, after each of the n solid-state drives receives a corresponding write command and writes data into an idle physical storage space to which a physical address points, the FTL function module in the array controller 100 modifies the global FTL list, and establishes, in the global FTL list, a mapping relationship between a logical address and a current physical address to which the data is written, where the current physical address to which the data is written is the physical address that is corresponding to each logical address and that is allocated by the FTL function module.

Figure 2:
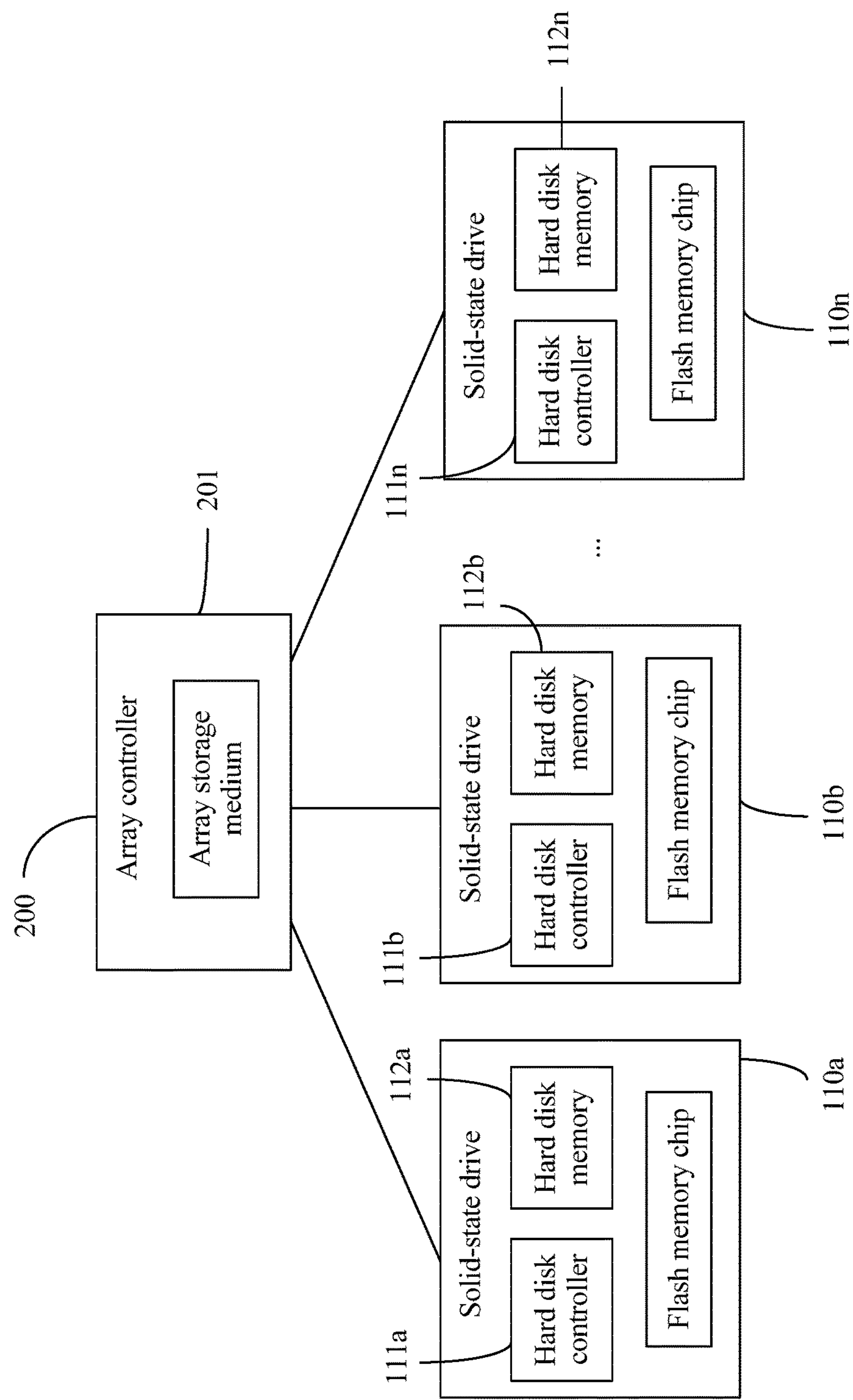
FIG. 2 is an architectural diagram of a solid-state drive array used when FTL management is implemented on each solid-state drive.

A second manner is shown in FIG. 2. FTL management is implemented on each solid-state drive. In addition to a flash memory chip, each solid-state drive has a hard disk controller 111 and a hard disk memory 112. The hard disk memory is configured to store intermediate data in a running process of the hard disk controller. A hard disk controller 111*a*, a hard disk controller 111*b*, . . . , and a hard disk controller 111*n* implement FTL management on a solid-state drive 110*a*, a solid-state drive 110*b*, . . . , and a solid-state drive 110*n*, respectively. Each solid-state drive has an FTL list. Each FTL list is located in a corresponding solid-state drive. Each FTL list maintains a mapping relationship between a logical address and a physical address in the corresponding solid-state drive. In addition, address management of an idle physical storage space of each solid-state drive is also implemented on each hard disk controller. When the FTL is implemented on each solid-state drive, a process in which the array controller 100 writes to-be-written data into the solid-state drive array is as follows: Segmentation of the to-be-written data and allocation of a corresponding logical address are still implemented by the array controller 100; after obtaining n data blocks and n logical addresses in the n corresponding solid-state drives, the controller 100 generates, for each data block, a data write command that includes a corresponding logical address, and delivers the n data write commands to the solid-state drive 110*a*, the solid-state drive 110*b*, . . . , and the solid-state drive 110*n*, respectively; after each solid-state drive receives a corresponding data write command, each hard disk controller writes, based on a logical address in the data write command, a corresponding data block into a virtual storage space to which the logical address points. Specifically, the hard disk controller of each solid-state drive first allocates an idle physical address on the solid-state drive to the logical address corresponding to the corresponding data block; and after writing the data block into a physical storage space to which the idle physical address points, performs FTL update of the corresponding data block based on an update command of the array controller 100. To be specific, each hard disk controller establishes, in an FTL list of the hard disk controller, a mapping relationship between a current physical address and the logical address corresponding to the data block, where the current physical address is the idle physical address allocated to the logical address by each hard disk controller.

As described above, FTL management may be implemented on the array controller 100, or may be implemented on each solid-state drive in the solid-state drive array. In this embodiment, methods for writing to-be-written data that are corresponding to the two implementations are slightly different. The following successively describes processes of writing the to-be-written data that are corresponding to the two implementations.

Figure 3:
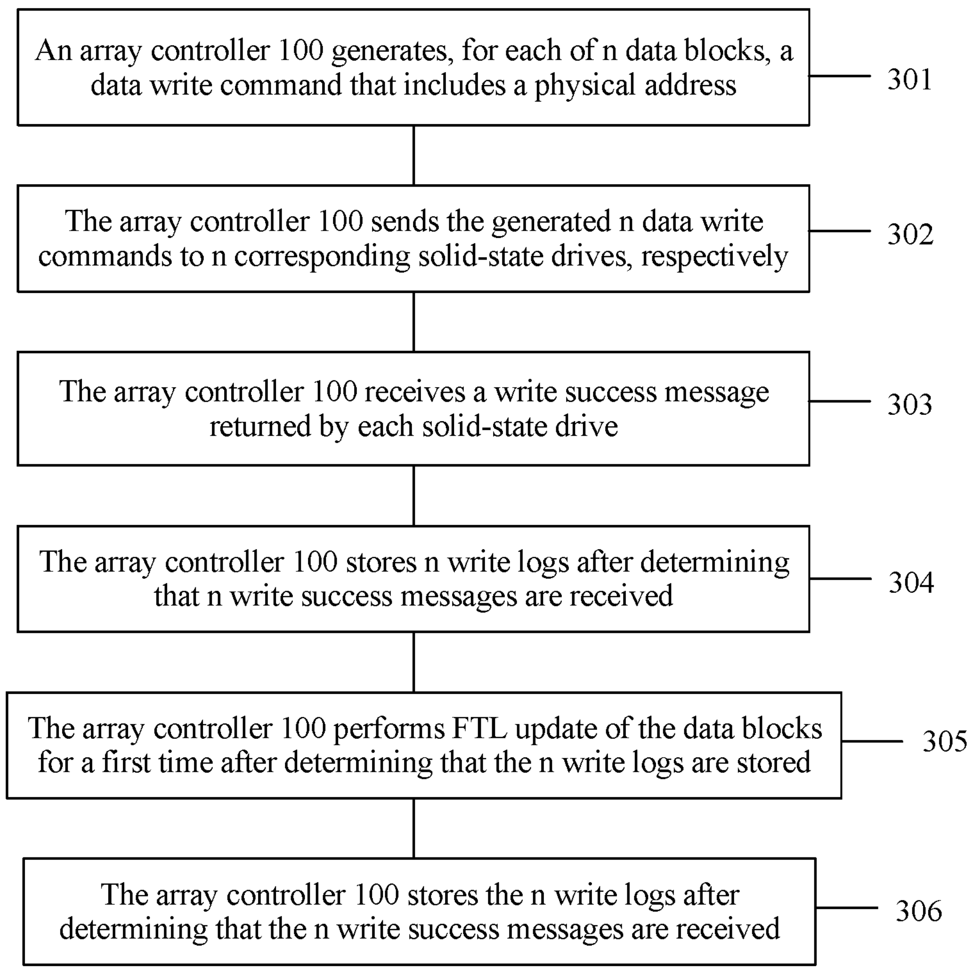
FIG. 3 is a flowchart of writing to-be-written data when FTL management is implemented on an array controller.

When FTL management is implemented on an array controller 100, the array controller 100 maintains a global FTL list. The global FTL list records a mapping relationship between a logical address and a physical address of a data block stored in a solid-state drive array. As shown in FIG. 3, a process of writing to-be-written data is as follows:

301. The array controller 100 divides the to-be-written data into n data blocks, and generates, for each data block, a data write command that includes a physical address.

The array controller 100 writes the to-be-written data into the solid-state drive array through data segmentation. When dividing the to-be-written data into n data blocks, the array controller 100 enables the n data blocks to be in a one-to-one correspondence with n solid-state drives. The array controller 100 allocates one solid-state drive to each data block, and determines a logical address of the solid-state drive corresponding to each data block. A solid-state drive 110*a*, a solid-state drive 110*b*, . . . , and a solid-state drive 110*n* are corresponding to a logical address Addr1, a logical address Addr2, . . . , and a logical address Addrn, respectively. The global FTL list stores n logical addresses Addri. Before the to-be-written data is written, the n logical addresses Addri may be mapped into original physical addresses in the global FTL list, or may not be mapped into original physical addresses in the global FTL list.

In addition, because an FTL management function is implemented on the array controller 100, each of the n solid-state drives writes, based on a current physical address addri allocated by the array controller 100, a data block into a physical storage space to which the current physical address addri points. After allocating the logical address Addri and the current physical address addri to each of the n data blocks, the array controller 100 further caches a mapping relationship between the n logical addresses and the n current physical addresses into a non-volatile memory for re-triggering FTL update of a data block after power-off. In addition, the logical address Addr and the current address addri that are corresponding to each data block and the mapping relationship between the logical address Addri and the current address addri are all intermediate data in the process of writing the to-be-written data, and are cached in the array controller 100.

302. The array controller 100 sends the generated n data write commands to n corresponding solid-state drives, respectively.

The array controller 100 sends each data write command to a corresponding solid-state drive. Each data write command includes a current address addri corresponding to a data block. To be specific, a data write command that includes a physical address addr1, a data write command that includes a physical address addr2, . . . , and a data write command that includes a physical address addrn are sent to the solid-state drive 110*a*, the solid-state drive 110*b*, . . . , and the solid-state drive 110*n*, respectively. Each data write command triggers a corresponding solid-state drive 110*i* to store a corresponding data block into an idle physical storage space to which a corresponding current address addri points. Specifically, each solid-state drive 110*i* obtains the corresponding data block based on the data write command, and obtains the current address addri corresponding to the data block from the data write command, where i is any value from 1 to n. After storing the corresponding data into the idle physical storage space to which the physical address points, each solid-state drive returns a write success response to the array controller 100.

303. The array controller 100 receives a write success message returned by each solid-state drive.

To implement separation of data write and FTL list update, the array controller 100 needs to perform FTL update after determining that all the solid-state drives complete storage of the corresponding data blocks. Therefore, the array controller 100 needs to receive the write success message returned by each solid-state drive, and does not store a write log or trigger FTL update of a data block until the array controller 100 determines that all the n write success messages are received.

304. The array controller 100 stores n write logs after determining that n write success messages are received.

The array controller 100 stores the n write logs into an array storage medium 102. The n write logs are in a one-to-one correspondence with the n data blocks, and each write log records index information of a corresponding data block. After being powered on again, the array controller 100 may find, based on the index information, a mapping relationship between a logical address Addri and a current physical address addri that are corresponding to a data block on which FTL update is not completed.

305. The array controller 100 triggers FTL update of the data blocks after storing the n write logs.

After determining that the n write logs are stored, the array controller 100 triggers FTL update of the data blocks, that is, establishing, in the global FTL list, the mapping relationship between the logical address Addri and the current physical address addri. Specifically, the array controller 100 reads, from an array memory 101, the cached logical address Addr1, logical address Addr2, . . . , and logical address Addrn and the cached mapping relationship between the n logical addresses Addr and the n physical addresses addr; and stores, into the global FTL list, the mapping relationship between the n logical addresses Addri and the n physical addresses addri. If an original mapping relationship between the logical address Addri and the original physical address exists in the global FTL list, the original mapping relationship is deleted. When the array controller 100 triggers FTL update of the data blocks, each time when FTL update of a data block is completed, the array controller 100 deletes a write log corresponding to the data block on which FTL update is completed.

When the array controller 100 and/or each solid-state drive are/is powered off during write of the to-be-written data, after being powered on again, the array controller 100 determines a status of a write log stored in the array storage medium 102. A step performed by the array controller 100 varies with the status of the write log stored in the array storage medium 102, to ensure atomicity of write operations of the data blocks. If the write log stored in the array storage medium 102 is in a first state, it indicates that the array controller 100 does not start FTL update or write log storage during power-off, and the array controller 100 re-initiates a write operation of the to-be-written data. If the write log stored in the array storage medium 102 is in a second state, it indicates that n write logs have been generated during power-off, and the array controller 100 re-triggers, based on the write log stored in the array storage medium 102, FTL update of a data block corresponding to the write log stored in the array storage medium 102. Specifically, the array controller 100 obtains index information in the stored write log from the write log stored in the array storage medium 102, and establishes, in the global FTL list based on the index information and the mapping relationship that is between the logical address Addri and the current physical address addri and that is cached in the non-volatile memory, a mapping relationship between a logical address Addri and a current physical address addri of the data block corresponding to the write log stored in the array storage medium 102.

Figure 4:
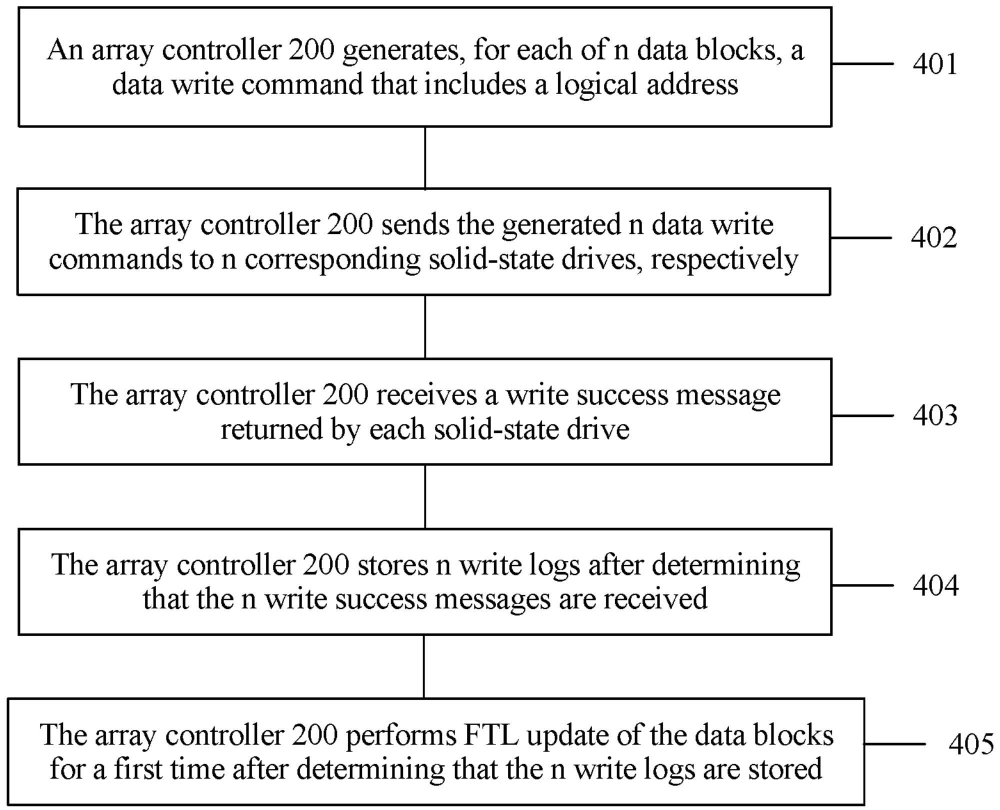
FIG. 4 is a flowchart of writing to-be-written data when FTL management is implemented on each solid-state drive.

When FTL management is implemented on each solid-state drive, as shown in FIG. 2, a hard disk controller 111*a*, a hard disk controller 111*b*, . . . , and a hard disk controller 111*n* implement FTL management on a solid-state drive 110*a*, a solid-state drive 110*b*, . . . , and a solid-state drive 110*n*, respectively. Each solid-state drive has an FTL list. As shown in FIG. 4, a process of writing to-be-written data is as follows:

401. An array controller 200 divides the to-be-written data into n data blocks, and generates, for each data block, a data write command that includes a logical address Addri.

Same as that in step 301, when dividing the to-be-written data into n data blocks, the array controller 200 enables the n data blocks to be in a one-to-one correspondence with the n solid-state drives. The array controller 200 allocates one solid-state drive to each data block, and determines a logical address Addri of the solid-state drive corresponding to each data block. The solid-state drive 110*a*, the solid-state drive 110*b*, . . . , and the solid-state drive 110*n* are corresponding to a logical address Addr1, a logical address Addr2, . . . , and a logical address Addrn, respectively.

Different from that in step 301, because the solid-state drives perform respective FTL management, an action of allocating, to a data block, a current physical address addri corresponding to the logical address Addri is performed by the hard disk controller 111*i* of each solid-state drive. The n data write commands generated by the array controller include n logical addresses Addri, and each data write command is corresponding to a logical address Addri of one data block.

402. The array controller 200 sends the generated n data write commands to n corresponding solid-state drives, respectively.

In this case, because the data write command includes the logical address Addri, in comparison with the method in which each solid-state drive stores a corresponding data block in step 302, in step 402, after a corresponding write command is received and a logical address Addri is obtained, the hard disk controller 111 of each solid-state drive first allocates a current physical address addri to a to-be-written data block by using an FTL management function. Then, the hard disk controller 111 of each solid-state drive stores the corresponding data block into an idle physical storage space to which the current physical address addri points.

In this step, a method in which each solid-state drive stores a corresponding data block is different from that in step 302.

After receiving the corresponding write command and obtaining the logical address Addri from the write command, each solid-state drive allocates the current physical address addri to the to-be-written data block by using the FTL management function, and stores the corresponding data block into the idle physical storage space that is in the corresponding solid-state drive and to which the current physical address addri points, where i is any value from 1 to n. After storing the corresponding data into the idle physical storage space to which the current physical address addri points, each solid-state drive returns a write success message to the array controller 200.

After allocating the current physical address addri to the data block, each solid-state drive further caches a mapping relationship between the logical address Addri and the current physical address addri into a non-volatile memory for triggering FTL update of a data block after power-off.

403. The array controller 200 receives a write success message returned by each solid-state drive.

Step 403 and step 303 are the same. The array controller 200 does not store a write log or trigger FTL update of a data block until the array controller 200 determines that n write success messages are received.

404. The array controller 200 stores n write logs after determining that the n write success messages are received.

Same as that in step 304, each write log records index information of a corresponding data block. After being powered on again, the array controller 200 may find, based on the index information, a mapping relationship between a logical address Addri and a current physical address addri that are corresponding to a data block on which FTL update is not completed.

405. The array controller 200 triggers FTL update of the data blocks after determining that the n write logs are stored.

A specific implementation of step 405 is different from that of step 403. Because the solid-state drives separately perform FTL management, a specific method for triggering FTL update of each data block includes the following steps:

The array controller 200 sends an update command to each of the n solid-state drives after determining that the n write logs are stored.

Each solid-state drive receives the update command; reads, from a hard disk memory 112 of each hard disk controller, the mapping relationship that is between the logical address Addri and the current physical address addri and that is cached in each solid-state drive; and establishes, in the FTL list of each solid-state drive, the mapping relationship between the logical address Addri and the current physical address addri of the corresponding data block, where i is any value from 1 to n.

After a solid-state drive completes FTL update of a corresponding data block, the solid-state drive returns an update success message to the array controller 200, and the array controller 200 deletes a write log corresponding to the data block on which FTL update is completed.

When the array controller 200 and/or each solid-state drive are/is powered off during write of the to-be-written data, the array controller 100 determines, after being powered on again, a status of a write log stored in the array storage medium 201. A step performed by the array controller 100 varies with the status of the write log stored in the array storage medium 201, to ensure atomicity of write operations of the data blocks. If the write log stored in the array storage medium 201 is in a first state, it indicates that the array controller 100 does not start FTL update or write log storage during power-off, and the array controller 100 re-initiates a write operation of the to-be-written data. If the write log stored in the array storage medium 201 is in a second state, it indicates that n write logs have been generated during power-off, and the array controller 100 re-triggers, based on the write log stored in the array storage medium 201, FTL update of a data block corresponding to the write log stored in the array storage medium 201. Specifically, the array controller 100 obtains index information in the stored write log from the write log stored in the array storage medium 201, and sends an update command to a solid-state drive in which the data block corresponding to the write log stored in the array storage medium 201 is located. The solid-state drive that receives the update command performs FTL update on the corresponding data block, that is, establishing, in the FTL list based on the mapping relationship that is between the logical address Addri and the current physical address addri and that is cached in the non-volatile memory, a mapping relationship between a logical address Addri and a current physical address addri of the data block corresponding to the write log stored in the array storage medium 201.

Figure 5:
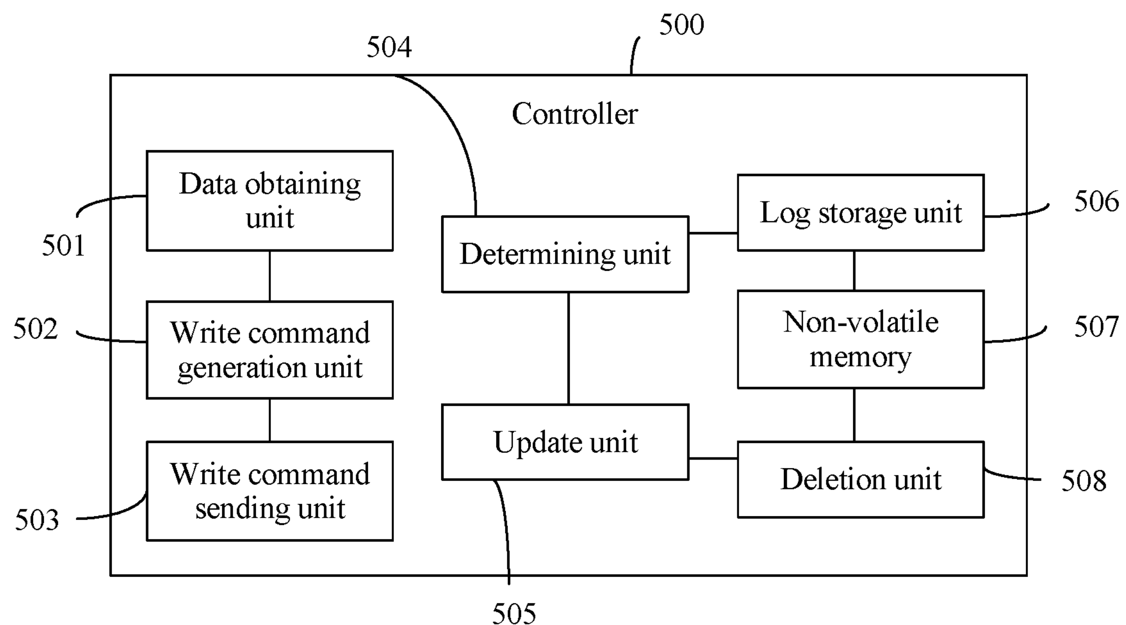
FIG. 5 is a schematic diagram of an array controller according to an embodiment of the present invention.

Correspondingly, an embodiment of the present invention further provides a solid-state drive array controller 500. The controller 500 is configured to write, into n solid-state drives in the solid-state drive array, to-be-written data that is divided into n data blocks, to ensure atomicity of write operations of the n data blocks. As shown in FIG. 5, the controller includes a data obtaining unit 501, a write command generation unit 502, a write command sending unit 503, a determining unit 504, and an update unit 505. The data obtaining unit 501 is configured to obtain the to-be-written data that includes n data blocks. The write command generation unit 502 is configured to: after the data obtaining unit 501 receives the to-be-written data, generate n write commands that are in a one-to-one correspondence with the n data blocks. The write command sending unit 503 is configured to send the n write commands generated by the write command generation unit to the n solid-state drives in the solid-state drive array. The n write commands are in a one-to-one correspondence with the n solid-state drives, and each write command is used to request a corresponding solid-state drive to store a data block corresponding to the write command. The determining unit 504 is configured to determine whether n write success responses corresponding to the n solid-state drives are received. If the determining unit 504 determines that the n write success responses corresponding to the n write commands are received, the update unit 505 is configured to trigger FTL update of the n data blocks. FTL update of each data block includes: establishing, in an FTL list, a mapping relationship between a logical address Addri of each of the n data blocks and a current physical address addri of the data block.

In addition, the controller 500 further includes a log storage unit 506 and a non-volatile memory 507. After the determining unit 504 determines that the n write success responses corresponding to the n write commands are received, before the update unit 505 performs FTL update of the n data blocks, the log storage unit 506 is configured to: generate n write logs, and store the n write logs into the non-volatile memory 507. The n write logs are in a one-to-one correspondence with the n data blocks, and each write log records index information of a corresponding data block.

The controller 500 further includes a deletion unit 508. The deletion unit 508 is configured to: after the update unit 505 completes FTL update of a data block, delete a write log corresponding to the data block on which FTL update is completed.

When each solid-state drive in the solid-state drive array maintains an FTL list of a current node, the update unit 505 configured to perform FTL update of the n data blocks is specifically configured to: generate n update commands that are in a one-to-one correspondence with the n data blocks, and send the n update commands to the n solid-state drives, respectively. Each update command is used to request a corresponding solid-state drive to perform FTL update of a corresponding data block. After the solid-state drive array and/or the controller 500 are/is powered on again, the determining unit 504 is further configured to determine a status of a write log stored in the non-volatile memory 507. If the write log stored in the non-volatile memory 507 is in a first state, the write command sending unit 503 is further configured to re-initiate a write operation of the to-be-written data. If the write log stored in the non-volatile memory 507 is in a second state, the update unit 505 is further configured to re-trigger FTL update based on the write log stored in the non-volatile memory. After the determining unit 504 determines that a solid-state drive completes FTL update of a corresponding data block, the deletion unit 508 is further configured to delete a write log corresponding to the data block on which FTL update is completed or performed again. That the update unit 505 is configured to re-trigger FTL update specifically includes: obtaining index information in each write log in the non-volatile memory 507; and establishing, in the FTL list of each solid-state drive based on the index information in each write log and a mapping relationship that is between a logical address Addri and a current physical address addri of a data block corresponding to each write log and that is stored in a non-volatile memory of each of the n solid-state drives, the mapping relationship between the logical address Addri and the current physical address addri of the data block corresponding to each write log.

When the controller 500 maintains a global FTL list, the update unit 505 configured to perform FTL update of the n data blocks is specifically configured to establish, in the global FTL list based on a logical address of each of the n data blocks, a mapping relationship between the logical address Addri of each of the n data blocks and a current physical address addri of each of the n data blocks. After the solid-state drive array and/or the controller 500 are/is powered on again, the determining unit 504 is further configured to determine a status of a write log stored in the non-volatile memory 507. If the write log stored in the non-volatile memory 507 is in a first state, the write command sending unit 503 is further configured to re-initiate a write operation of the to-be-written data. If the write log stored in the non-volatile memory 507 is in a second state, the update unit 505 is further configured to re-trigger FTL update based on the write log stored in the non-volatile memory. After the determining unit 504 determines that FTL update of a data block is completed or performed again, the deletion unit 508 is further configured to delete a write log corresponding to the data block on which FTL update is completed or performed again. That the update unit 505 is configured to re-trigger FTL update specifically includes: obtaining index information in each write log in the non-volatile memory 507; and establishing, in the global FTL list based on the index information in each write log and a mapping relationship that is between a logical address and a current physical address of a data block corresponding to each write log and that is stored in a non-volatile memory of each of the n solid-state drives, the mapping relationship between the logical address and the current physical address of the data block corresponding to each write log.

Each unit in the controller 500 may be implemented by a corresponding hardware chip. In another implementation, one or more units may be integrated into one hardware chip. In another implementation, each unit in the controller 500 may be implemented by a processor by executing a computer instruction in a memory. No limitation is imposed thereon in this embodiment of the present invention.

Figure 6:
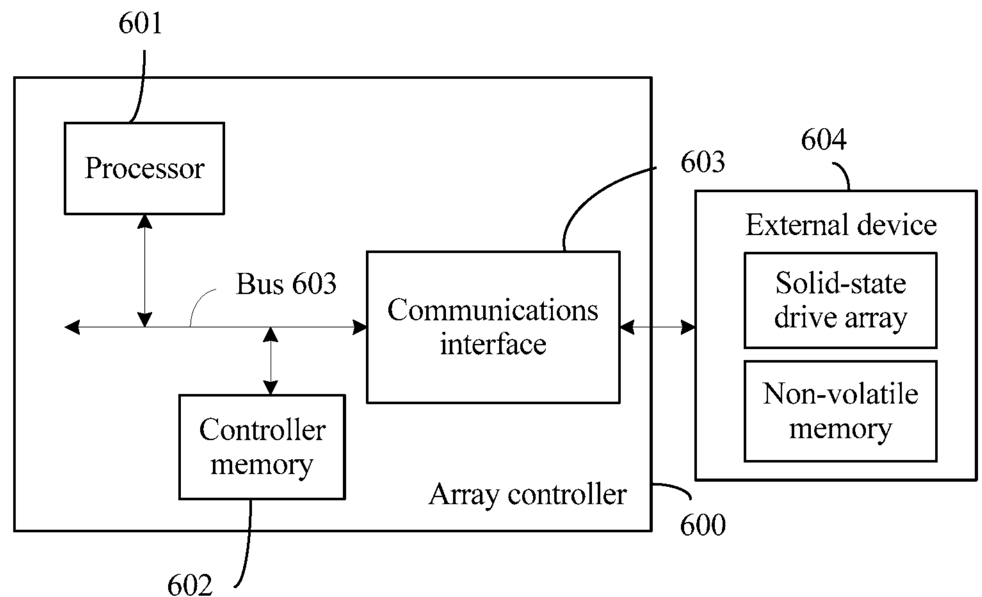
FIG. 6 is a schematic diagram of another array controller according to an embodiment of the present invention.

FIG. 6 is a schematic structural diagram of a controller 600 according to an embodiment of the present invention.

As shown in FIG. 6, the controller 600 includes a processor 601, and the processor 601 is connected to a controller memory 602. The processor 601 may be computing logic such as a central processing unit (CPU), a graphics processing unit (GPU), a field programmable gate array (FPGA), or a digital signal processor (DSP), or any combination of the foregoing computing logic. The processor 601 may be a single-core processor or a multi-core processor. A bus 603 is configured to transmit information between components of the controller 600. The bus 603 may use a wired connection manner or a wireless connection manner. No limitation is imposed thereon in this application. The bus 603 is further connected to a communications interface 604. The communications interface 604 uses a transceiving apparatus that includes but is not limited to a transceiver, to implement connection to an external device 605. The communications interface 604 and a network may be connected to each other in a wired or wireless manner. The external device 605 includes a solid-state drive array and a non-volatile memory configured to cache intermediate data in a running process of the controller 600. The method in the embodiments of the present invention may be completed/supported by the processor 601 by executing software code in the controller memory 602.

In addition, FIG. 6 is merely an example of the controller 600. The controller 600 may include more or fewer components than those shown in FIG. 6, or may have different component configuration manners. Moreover, each component shown in FIG. 6 may be implemented by hardware, software, or a combination of hardware and software.

Figure 7:
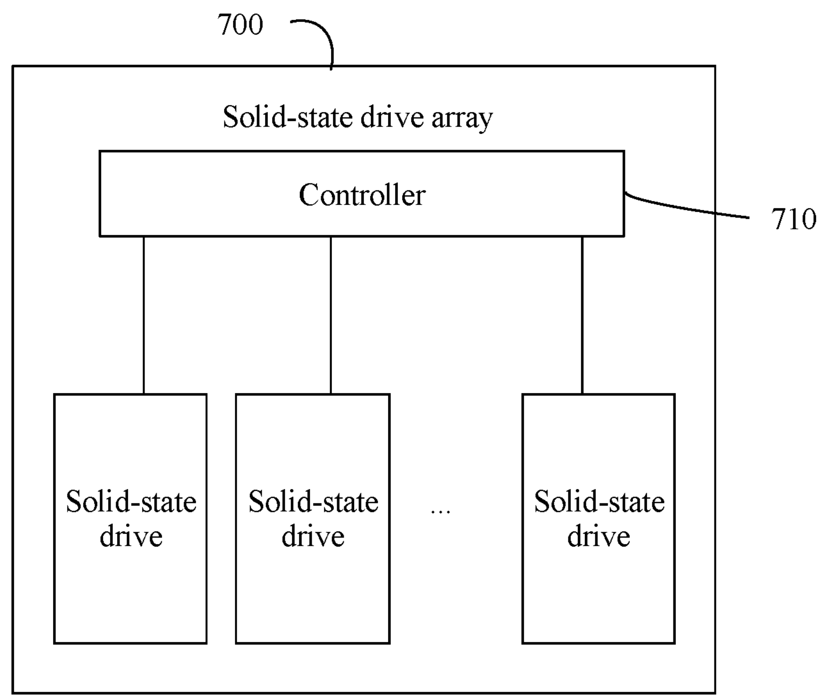
FIG. 7 is a schematic diagram of a solid-state drive array according to an embodiment of the present invention.

An embodiment of the present invention further provides a solid-state drive array. As shown in FIG. 7, a solid-state drive array 700 includes a controller 710 and n solid-state drives.

The controller 710 is configured to:

obtain to-be-written data that includes n data blocks;

generate n write commands, where the n write commands are in a one-to-one correspondence with the n data blocks; and send the n write commands to the n solid-state drives, respectively, where the n write commands are in a one-to-one correspondence with the n solid-state drives.

Each of then solid-state drives is configured to:

store, based on a corresponding write command, a data block corresponding to the write command; and after storing the data block corresponding to the write command, send a write success response to the controller 710, where if determining that n write success responses corresponding to the n write commands are received, the controller 710 performs FTL update of the n data blocks.

The controller 710 is further configured to:

if determining that the n write success responses corresponding to the n write commands are received, before performing FTL update of the n data blocks, generate n write logs, and store the n write logs into a non-volatile memory of the controller, where the n write logs are in a one-to-one correspondence with the n data blocks, and each write log records index information of a corresponding data block.

When each solid-state drive in the solid-state drive array is further configured to maintain an FTL list of a current node, that the controller 710 is configured to perform FTL update of the n data blocks specifically includes:

generating n update commands, where the n update commands are in a one-to-one correspondence with the n data blocks; and sending the n update commands to the n solid-state drives, respectively.

Each solid-state drive in the solid-state drive array is further configured to: receive the update command sent by the controller; perform FTL update of a stored data block, that is, establishing, in the FTL list of the current node, a mapping relationship between a logical address of each data block and a current physical address of the data block; and after successfully performing FTL update of the stored data block, send an update success message to the controller 710.

The controller 710 is further configured to: receive an update success message sent by any one of the n solid-state drives, and delete a write log of a data block corresponding to the solid-state drive that sends the update success message.

When the controller 710 is further configured to maintain a global FTL list, that the controller is configured to perform FTL update of the n data blocks specifically includes: establishing, in the global FTL list based on a logical address of each of the n data blocks, a mapping relationship between the logical address of each of the n data blocks and a physical address of each of the n data blocks; and after completing FTL update of a data block, deleting a write log corresponding to the data block on which FTL update is completed.

The controller 710 is further configured to: after the solid-state drive array and/or the controller are/is powered on again, determine a status of a write log stored in the non-volatile memory of the controller 710; and if the write log stored in the non-volatile memory of the controller 710 is in a first state, re-initiate a write operation of the to-be-written data; or after the solid-state drive array and/or the controller are/is powered on again, determine a status of a write log stored in the non-volatile memory of the controller 710; if the write log stored in the non-volatile memory of the controller 710 is in a second state, perform FTL update again based on the write log stored in the non-volatile memory of the controller 710; and after determining that FTL update of a data block is completed again, delete a write log corresponding to the data block on which FTL update is completed again. Performing FTL update again specifically includes: obtaining index information in each write log in the non-volatile memory of the controller 710; obtaining, based on the index information in each write log, a mapping relationship that is between a logical address and a current physical address of a data block corresponding to each write log and that is stored in the non-volatile memory of the controller 710 or a non-volatile memory of each of the n solid-state drives; and establishing, in the FTL list, the mapping relationship between the logical address and the current physical address of the data block corresponding to each write log.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data write method, wherein the method is applied to a solid-state drive array, and the method comprises:

obtaining, by a controller of the solid-state drive array, to-be-written data, wherein the to-be-written data comprises n data blocks;

generating, by the controller, n write commands, wherein the n write commands are in a one-to-one correspondence with the n data blocks;

sending, by the controller, the n write commands to n solid-state drives in the solid-state drive array, respectively, wherein the n write commands are in a one-to-one correspondence with the n solid-state drives, and each write command is used to request a corresponding solid-state drive to store a data block corresponding to the write command;

determining, by the controller, whether n write success responses corresponding to the n write commands are received; and triggering, by the controller, flash translation layer (FTL) update of the n data blocks when the n write success responses corresponding to the n write commands are received, wherein FTL update of each data block comprises: establishing, in an FTL list, a mapping relationship between a logical address of each data block and a current physical address of the data block, wherein if the controller determines that the n write success responses corresponding to the n write commands are received, before the triggering, by the controller, FTL update of the n data blocks, the method further comprises:

generating, by the controller, n write logs, and storing the n write logs into a non-volatile memory, wherein the n write logs are in a one-to-one correspondence with the n data blocks, and each write log records index information of a corresponding data block, wherein the method further comprises:

after the solid-state drive array and/or the controller are/is powered on again, determining, by the controller, a status of a write log stored in the non-volatile memory; and if the write log stored in the non-volatile memory of the controller is in a second state, re-triggering FTL update based on the write log stored in the non-volatile memory of the controller, the re-triggering, by the controller, FTL update based on the write log in the non-volatile memory of the controller comprises:

obtaining, by the controller, index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining, by the controller, index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

2. The method according to claim 1, wherein each solid-state drive in the solid-state drive array maintains an FTL list of a current node, and the FTL list of the current node of each solid-state drive is used to record a mapping relationship between a logical address and a physical address of a data block stored in the solid-state drive; and the triggering, by the controller, FTL update of the n data blocks specifically comprises:

generating, by the controller, n update commands, wherein the n update commands are in a one-to-one correspondence with the n data blocks; and sending, by the controller, the n update commands to the n solid-state drives, respectively, wherein each update command is used to request a corresponding solid-state drive to perform FTL update of a corresponding data block.

3. The method according to claim 2, wherein the method further comprises:

receiving, by the controller, an update success message sent by any one of the n solid-state drives, and deleting, by the controller, a write log of a data block corresponding to the solid-state drive that sends the update success message.

4. The method according to claim 1, wherein the controller maintains a global FTL list, and the global FTL list is used to record a mapping relationship between a logical address and a physical address of a data block stored in the solid-state drive array; and the triggering, by the controller, FTL update of the n data blocks comprises:

establishing, by the controller in the global FTL list based on a cached mapping relationship between a logical address and a current physical address to which each of the n data blocks is stored, the mapping relationship between the logical address of each of the n data blocks and the current physical address of each of the n data blocks.

5. The method according to claim 4, wherein after completing FTL update of a data block, the controller deletes a write log corresponding to the data block on which FTL update is completed.

6. The method according to claim 1, wherein the method further comprises:

after the solid-state drive array and/or the controller are/is powered on again, determining, by the controller, a status of a write log stored in the non-volatile memory; and if the write log stored in the non-volatile memory of the controller is in a first state, re-initiating, by the controller, a write operation of the to-be-written data.

7. The method according to claim 1, wherein the method further comprises:

determining, by the controller, whether FTL update of a data block is completed, and deleting a write log corresponding to a data block on which FTL update is completed.

8. A solid-state drive array controller, wherein the controller comprises a processor and a memory, and the processor is configured to execute a computer instruction stored in the memory to implement the following method:

obtaining to-be-written data, wherein the to-be-written data comprises n data blocks;

generating wherein the n write commands are in a one-to-one correspondence with the n data blocks;

sending the n write commands to n solid-state drives in the solid-state drive array, respectively, wherein the n write commands are in a one-to-one correspondence with the n solid-state drives, and each write command is used to request a corresponding solid-state drive to store a data block corresponding to the write command;

determining whether n write success responses corresponding to the n write commands are received; and triggering FTL update of the n data blocks when the n write success responses corresponding to the n write commands are received, wherein FTL update of each data block comprises: establishing, in an FTL list, a mapping relationship between a logical address of each data block and a current physical address of the data block, wherein if the controller determines that the n write success responses corresponding to the n write commands are received, before the triggering, by the controller, FTL update of the n data blocks, the method further comprises:

generating, by the controller, n write logs, and storing the n write logs into a non-volatile memory, wherein the n write logs are in a one-to-one correspondence with the n data blocks, and each write log records index information of a corresponding data block, wherein the method further comprises:

after the solid-state drive array and/or the controller are/is powered on again, determining, by the controller, a status of a write log stored in the non-volatile memory; and if the write log stored in the non-volatile memory of the controller is in a second state, re-triggering FTL update based on the write log stored in the non-volatile memory of the controller, the re-triggering, by the controller, FTL update based on the write log in the non-volatile memory of the controller comprises:

obtaining, by the controller, index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining, by the controller, index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

9. A solid-state drive array, wherein the solid-state drive array comprises a controller and n solid-state drives;

the controller is configured to:

obtain to-be-written data, wherein the to-be-written data comprises n data blocks;

generate n write commands, wherein the n write commands are in a one-to-one correspondence with the n data blocks; and send the n write commands to the n solid-state drives, respectively, wherein the n write commands are in a one-to-one correspondence with the n solid-state drives;

each of the n solid-state drives is configured to:

store, based on a corresponding write command, a data block corresponding to the write command; and after storing the data block corresponding to the write command, send a write success response to the controller; and the controller is further configured to:

determine whether n write success responses corresponding to the n write commands are received; and trigger FTL update of the n data blocks when the n write success responses corresponding to the n write commands are received, wherein FTL update of each data block comprises: establishing, in an FTL list, a mapping relationship between a logical address of each data block and a current physical address of the data block, wherein if the controller determines that the n write success responses corresponding to the n write commands are received, before the triggering, by the controller, FTL update of the n data blocks, the method further comprises:

generating, by the controller, n write logs, and storing the n write logs into a non-volatile memory, wherein the n write logs are in a one-to-one correspondence with the n data blocks, and each write log records index information of a corresponding data block, wherein the method further comprises:

after the solid-state drive array and/or the controller are/is powered on again, determining, by the controller, a status of a write log stored in the non-volatile memory; and if the write log stored in the non-volatile memory of the controller is in a second state, re-triggering FTL update based on the write log stored in the non-volatile memory of the controller, the re-triggering, by the controller, FTL update based on the write log in the non-volatile memory of the controller comprises:

obtaining, by the controller, index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining, by the controller, index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

10. A non-transitory computer-readable storage medium, wherein the computer-readable storage medium stores a computer instruction, and the computer instruction is executed by a solid-state drive array controller cause the solid-state drive array to perform the following method:

obtaining to-be-written data, wherein the to-be-written data comprises n data blocks;

generating wherein the n write commands are in a one-to-one correspondence with the n data blocks;

sending the n write commands to n solid-state drives in the solid-state drive array, respectively, wherein the n write commands are in a one-to-one correspondence with the n solid-state drives, and each write command is used to request a corresponding solid-state drive to store a data block corresponding to the write command;

determining whether n write success responses corresponding to the n write commands are received; and triggering FTL update of the n data blocks when the n write success responses corresponding to the n write commands are received, wherein FTL update of each data block comprises: establishing, in an FTL list, a mapping relationship between a logical address of each data block and a current physical address of the data block, wherein if the controller determines that the n write success responses corresponding to the n write commands are received, before the triggering, by the controller, FTL update of the n data blocks, the method further comprises:

generating, by the controller, n write logs, and storing the n write logs into a non-volatile memory, wherein the n write logs are in a one-to-one correspondence with the n data blocks, and each write log records index information of a corresponding data block, wherein the method further comprises:

after the solid-state drive array and/or the controller are/is powered on again, determining, by the controller, a status of a write log stored in the non-volatile memory; and if the write log stored in the non-volatile memory of the controller is in a second state, re-triggering FTL update based on the write log stored in the non-volatile memory of the controller, the re-triggering, by the controller, FTL update based on the write log in the non-volatile memory of the controller comprises:

obtaining, by the controller, index information in each write log in the non-volatile memory; obtaining, based on the index information in each write log, a cached mapping relationship between a logical address and a current physical address of a data block corresponding to each write log; and establishing, in the global FTL list, the mapping relationship between the logical address and the current physical address of the data block corresponding to each write log; or obtaining, by the controller, index information in each write log in the non-volatile memory, and sending the obtained index information in each write log to a corresponding solid-state drive, so that the corresponding solid-state drive obtains, based on the obtained index information, a cached mapping relationship between a logical address and a current physical address of a data block corresponding to each write log, and establishes, in an FTL list of a current node, the mapping relationship between the logical address and the current physical address of the data block corresponding to each write log.

* * * * *